(12) United States Patent
Reading

(10) Patent No.: US 7,604,292 B1
(45) Date of Patent: Oct. 20, 2009

(54) VEHICLE SEAT WITH DYNAMIC CUSHION AND LUMBAR SUPPORT

(76) Inventor: Randall C. Reading, 11 Myra St., Redlands, CA (US) 92373

( * ) Notice: Subject to any disclaimer, the term of this patent is extended or adjusted under 35 U.S.C. 154(b) by 0 days.

(21) Appl. No.: 11/592,414

(22) Filed: Nov. 3, 2006

Related U.S. Application Data (60) Provisional application No. 60/733,511, filed on Nov. 3, 2005.

(51) Int. Cl.
*B62J 1/00* (2006.01)
(52) U.S. Cl. .............. 297/215.12; 297/284.6; 297/284.8; 297/215.11; 297/354.12
(58) Field of Classification Search ........... 297/452.41, 297/284.6, 284.8, 284.4, 284.7, 354.12, 215.1, 297/215.11, 215.12
See application file for complete search history.

(56) References Cited

U.S. PATENT DOCUMENTS

| | | | |
|---|---|---|---|
| 4,541,136 A | 9/1985 | Graebe | |
| 5,244,251 A | 9/1993 | Bourla | |
| 5,369,828 A | 12/1994 | Graebe | |
| 5,461,741 A | 10/1995 | Graebe | |
| 5,487,197 A | 1/1996 | Iskra, Jr. et al. | |
| 5,502,855 A | 4/1996 | Graebe | |
| 5,551,107 A | 9/1996 | Graebe | |
| 5,634,685 A | 6/1997 | Herring | |
| 5,658,050 A * | 8/1997 | Lorbiecki | 297/284.6 X |
| 5,669,660 A | 9/1997 | Matthies | |
| 5,711,573 A | 1/1998 | Daniels et al. | |
| 5,769,488 A | 6/1998 | Daniels et al. | |
| 5,997,088 A * | 12/1999 | Stark et al. | 297/215.12 |
| 6,018,832 A | 2/2000 | Graebe | |
| 6,161,238 A | 12/2000 | Graebe | |
| 6,224,081 B1 * | 5/2001 | Wayman et al. | 297/215.12 |
| 6,687,936 B2 | 2/2004 | Graebe et al. | |
| 6,942,291 B2 | 9/2005 | Yu | |
| 2005/0121953 A1 | 6/2005 | Sprouse, II | |

OTHER PUBLICATIONS

The Roho Group, The ROHO Group—shape fitting technology, The history of The ROHO Group, copyring 2001, printed May 24, 2005, two pages.

* cited by examiner

*Primary Examiner*—Anthony D Barfield
(74) *Attorney, Agent, or Firm*—Law Offices of David L. Hoffman (57) ABSTRACT

In one embodiment there is a lumbar support system for fitting on a motorcycle or other similar vehicle. There is a bracket for connecting the lumbar support to the seat pan. There is a mechanism for pivotably connecting the bracket to the lumbar support. There is a mechanism for connecting the seat pan adjustably to a rear fender of the vehicle. The height of the lumbar support may be adjustable. The pitch and lateral position of the support may also be adjustable. There is also an air cushion with multiple chambers disposed within a recess in the seat pan, such air cushion and seat pad being covered with foam and a leather, vinyl or other cover.

14 Claims, 8 Drawing Sheets

VEHICLE SEAT WITH DYNAMIC CUSHION AND LUMBAR SUPPORT

CROSS REFERENCE TO RELATED APPLICATION(S)

This application claims priority from U.S. Provisional Patent Application Ser. No. 60/733,511 filed Nov. 3, 2005, and which is incorporated by reference herein.

FIELD OF THE INVENTION

The present invention relates to a vehicle seat with a dynamic cushion and lumber support.

BACKGROUND OF THE INVENTION

A motorcycle or bicycle seat can become uncomfortable over a period of time. A rider's weight will be focused on one area of each side of his or her rear end. Shifting positions will only be a very short term solution, because the rider's anatomy will normally maintain the same pressure points. Use of a cushioned seat does not change the fact that the pressure points still exist.

It has been proposed to place, on a seat cushion, an air cushion such as made by The Roho Group, Inc., known as the Airhawk® comfort seating system. The proposal is that the product sits on a motorcycle seat made of gel or foam. The product has air chambers and has a stretchable or polymer material.

One operates the cushion by filling it up e.g., by mouth. The cushion is inflated until the entire cushion arches slightly upward, roughly seventy percent full.

Further, often motorcycles have a very small upside down U-shaped bar behind the seat or nothing at all behind the seat. Occasionally, a motorcyclist has a large bar. In any case, there is little or no lumbar support and little or no comfort.

SUMMARY OF THE INVENTION

In one embodiment, there is a lumbar support system for fitting on a motorcycle or other similar vehicle. There is a bracket for connecting the lumbar support to the seat pan. There is a mechanism for pivotably connecting the bracket to the lumbar support. There is a mechanism for connecting the seat pan adjustably to a rear fender of the vehicle. The height of the lumbar support may be adjustable. The pitch and lateral position of the support may also be adjustable.

There is also an air cushion with multiple chambers disposed within a recess in the seat pan, such air cushion and seat pad being covered with foam and a leather, vinyl or other cover.

DESCRIPTION OF THE PREFERRED EMBODIMENT(S)

Figure 1:
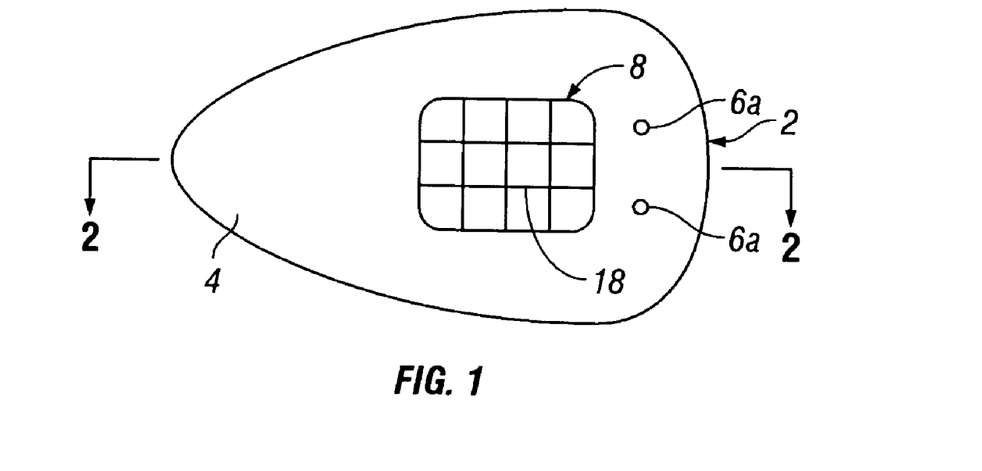
FIG. 1 is a top view of a seat with an incorporated air cushion of an embodiment of the invention.
Figure 3:
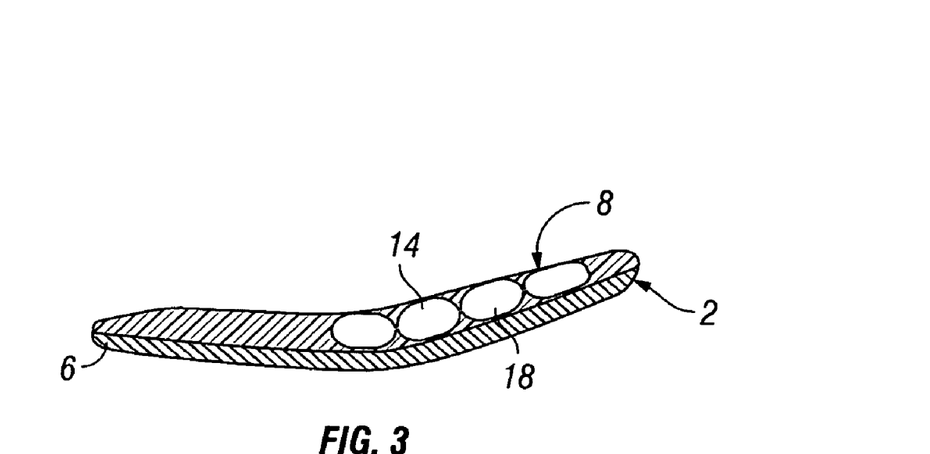
FIG. 3 is a view similar to FIG. 2 with the air cushion in a second position.
Figure 6:
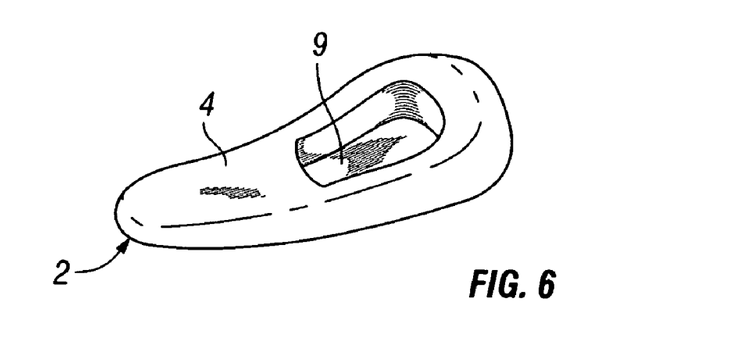
FIG. 6 is a perspective view of the seat of FIG. 1 with the cushion removed, showing hollowed section of the seat pad for receiving the cushion.

As shown in FIGS. 1 and 3, a seat 2 has a foam cushion 4 fixed on a seat pan 6, typically of a plastic, polymer or other relatively rigid material. The seat pan is mounted to the frame of a motorcycle or bicycle or similar two or three wheeled open vehicle or ATV. The seat pad has a hollowed out section 9 (FIG. 6) with side walls 9a (FIG. 9) which receives an air cushion device 8. The air cushion device has a base 12, typically of a plastic material or polymer.

Figure 2:
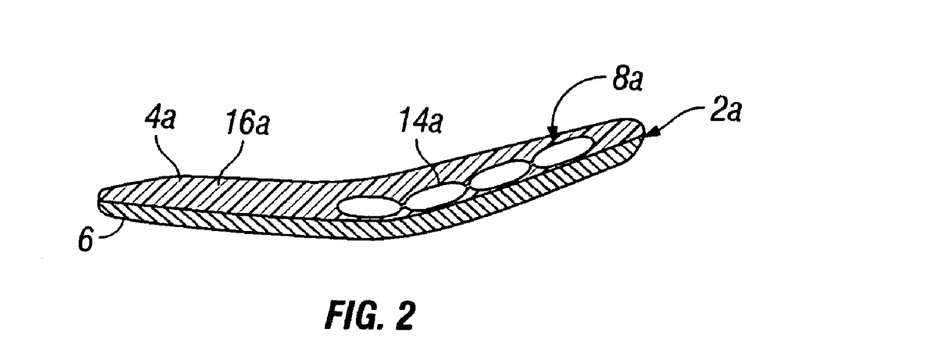
FIG. 2 is a side cutaway view taken along a line 2-2 of a seat according to FIG. 1 with the air cushion in a first position.

FIG. 2 shows a seat 2a with foam 4a and an air chamber device 8a being positioned in the seat so as to have its top surface 14a below top surface 16a of the seat. In FIG. 2, the cushion is about one half inflated.

FIG. 3 shows a variation of inflation of the air cushion device 8 having its top surface 14 almost at the surface of the seat 2. In FIG. 3, the chambers 18 are more inflated than in FIG. 2.

Figure 4:
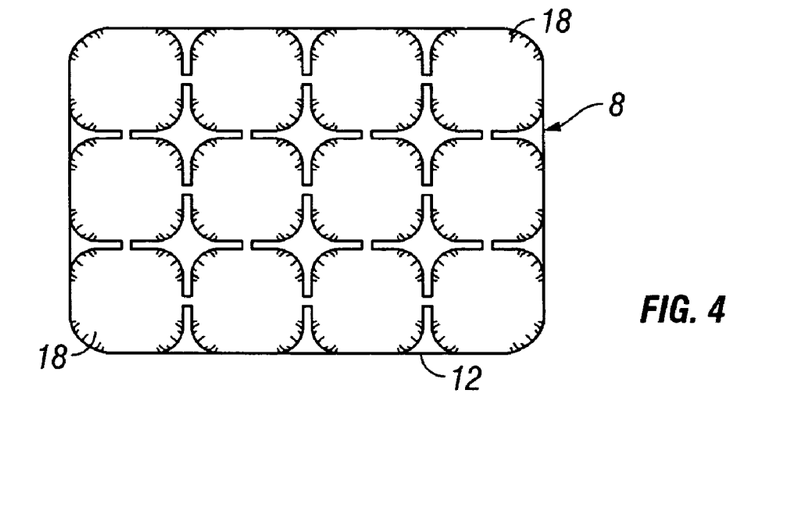
FIG. 4 is a perspective view of the cushion in the seat of FIG. 1.
Figure 5:
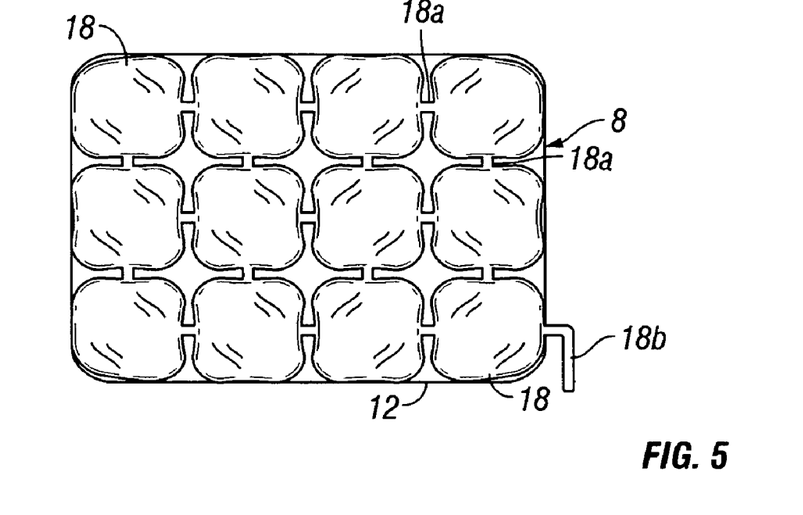
FIG. 5 is a perspective view of the underside of the cushion of FIG. 4.

In the illustrated embodiment, as shown in FIGS. 4 and 5, air cushion device 8 has twelve chambers 18, formed, e.g., by a suitable plastic or polymer material which is airtight and of sufficient durability to support the load of a human rider. Any suitable number of chambers may be used.

Air cushion device 8 has a base 12 and passages or valves 18a between its chambers, and an inflation inlet 18b with a built-in normally closed valve, e.g., as in a raft or other blowup device. Air may pass from chamber to chamber. The effect is such that when a rider shifts position, the position of the air in the seat shifts too, allowing for and causing a change in the air cushion chambers which causes a change in the pressure points on the rider's bottom. The effect of the rider's motion on the seat as the rider rides and experiences bumps, turns, vibrations, and other disturbances, as well as the rider's own intentional movements, causes, essentially, a slow speed massaging or wave effect of the air in the chambers.

Because the typical sitting bone area is about 6" wide, a cushion of about 7" to 8" wide is preferred. The length of the cushion may be about 10" to about 11" in a preferred embodiment. These ranges may be varied depending upon needs and applications.

It is preferable to have at least about 50 percent of the air capacity of the air cushion device up to about 80 percent of air capacity, and most preferably at about 60 to about 80 percent capacity, represented by, e.g., FIGS. 2 and 3 respectively.

Generally, a biker prefers a low profile seat. With the incorporation of the air chamber device of one embodiment into the seat pan 6 (FIG. 6), the profile of typical seats may be maintained at no more than about 1¾" to 2" tall. The foam 6 is normally covered, as in a typical vehicle, by leather or vinyl cover layer 16*a* (FIG. 2).

The seat pan may be made from aluminum, fiberglass, carbon composite, epoxy resins, injection molded plastics or other suitable materials. The seat core is (foam 4*a*) preferably a two-part polymer foam seat core either cast with an appropriate cavity for air cushion device 8 or cast directly over and around device 8. The foam seat core is preferably cast directly onto the seat pan and achieves adhesion in the curing process or bay be cast separately and then cemented to the seat pan.

The seat cover of leather or vinyl simulation encases the seat core and wraps around sufficiently to be attached to the underside of the seat pan, with screws, rivets or appropriate adhesive and/or combinations of such attachment devices as typically done with a foam seat.

A cavity is located in the seat pan and/or the foam (cushioning layer) and is in communication with the seat pan and/or the seat cover or both or may be buffered with further cushioning material between the seat pan and/or seat cover.

Motorcycle Lumbar Support

In conjunction with the seat described above, or used on its own with a conventional seat, a second embodiment includes a folding, fully adjustable fore and aft, up and down, removable lumbar/backrest support for motorcycle seats or other two or three wheeled open and/or ATV-type vehicles.

As shown in FIGS. 7-10, two mounting brackets 21 slide into, clip onto or bolt to existing motorcycle seats or an aftermarket seat, such as above seat 2. In the illustrated embodiment, there is simply a friction fit within holes 6*a*. Connecting the two mounting brackets 21 is a single (e.g., quarter inch diameter) through rod 22 threaded on both ends where it is bolted or fixed by bolts 22*a*, 22*b* to the brackets 21.

A friction shaft 23 of sufficient length (minimal end to end clearance) slides over through rod 22 and is free to rotate around rod 22.

A torsion spring 29 is located at one end 23*a* of friction shaft 23. Spring 29 is slid over friction shaft 23 with zero clearance between the friction shaft outer diameter and the torsion spring's inner diameter so the spring acts on the shaft 23.

One leg 29*b* of the torsion spring is attached to one mounting bracket 21 (or other fixed element) thus keeping spring 29 stationary. Friction shaft 23 will be free to rotate inside spring 29 in one direction of rotation (for forward movement of the frame 30), while binding against the spring in the other direction of rotation (rear movement of frame 30). The other leg 29*a* of the torsion spring will remain unattached and exposed so that lifting the leg 29*a* against the directional winding of the spring releases the torsion spring's grip on the friction shaft 23, allowing rearward rotation of brackets 25 and frame 30 with shaft 23.

Each of the two connecting brackets 25 are fastened at their lower ends to friction shaft 23 to rotate with it, and are of sufficient length to create a fore and aft position of the frame 30 relative to the mounting brackets 21 when the friction shaft is rotated as discussed above.

Height Adjustment

Figure 7:
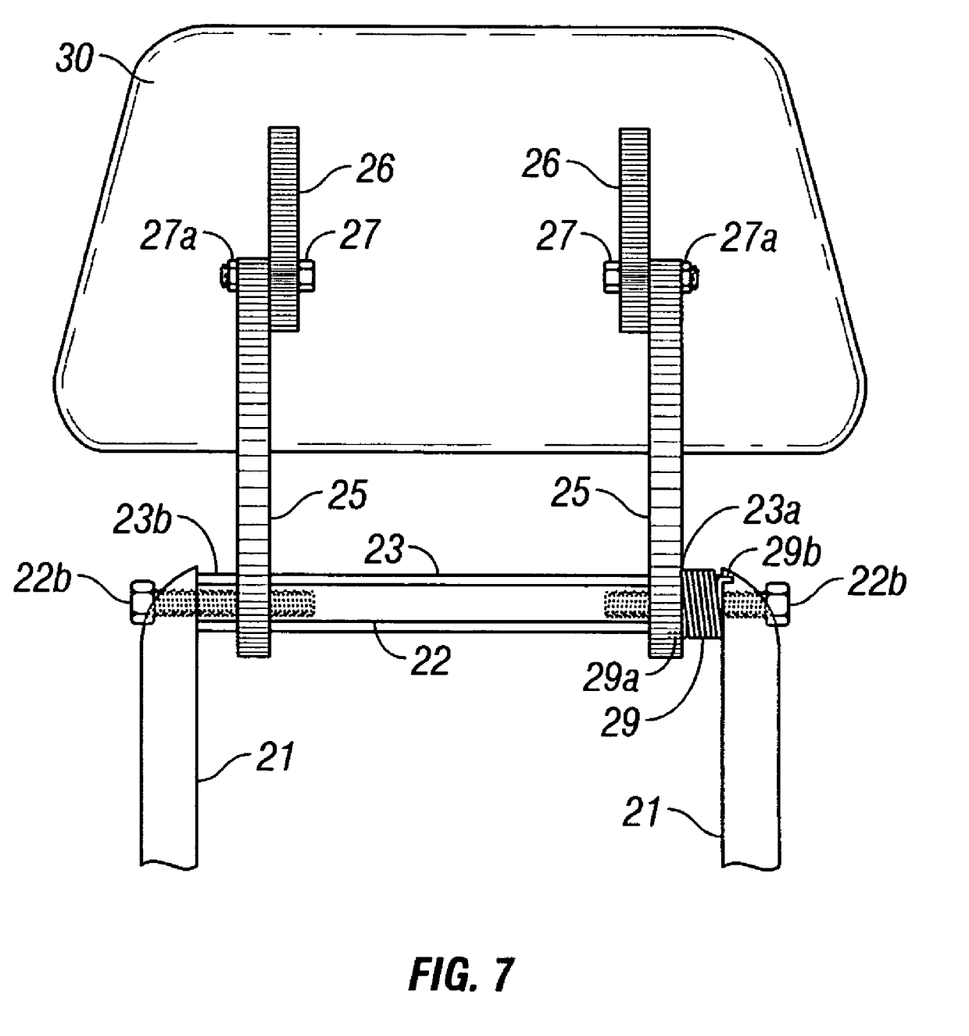
FIG. 7 is a rear partial schematic view of a lumbar support device of a preferred embodiment, without a seat pan.
Figure 8:
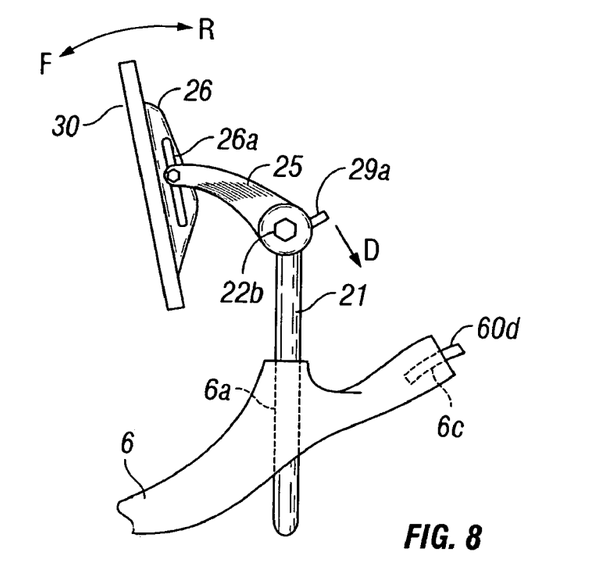
FIG. 8 is a partial schematic side view of structure of FIG. 7 with a view of a seat pan.
Figure 9:
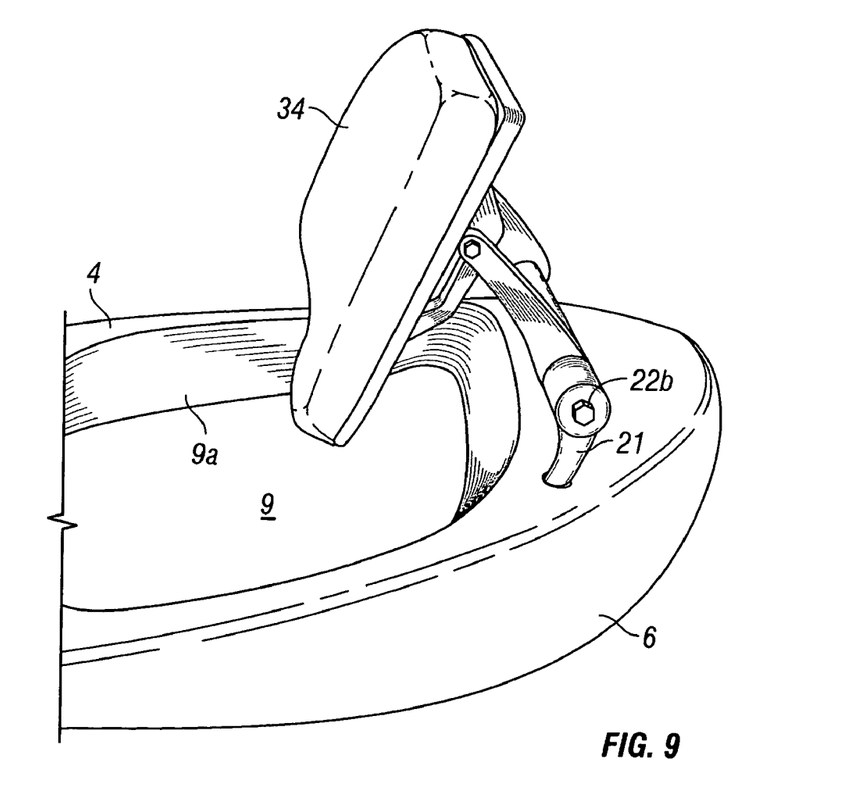
FIG. 9 is a side perspective view of a lumbar support device of FIG. 7 in more detail, showing the seat pan and a lumbar pad mounted on a motorcycle.

Lumbar frame 30 (seat back) is preferably cast or formed with two parallel brackets 26 (or otherwise fixed to frame 30) that are vertically arranged and parallel to connecting brackets 25. Brackets 26 have slots 26*a* in them that allow a collar bolt 27 to pass through brackets 26, then through brackets 25. The end of the collar bolt is fitted with a nut 27*a*, e.g., a Nylon® nut, to allow for precise tension adjustment sufficient to hold the support in its vertical position, yet enable the rider to adjust the height by pulling up or down on the frame 30. That is, the rider simply pulls up or pushes down on the lumbar frame 30 sliding the connecting brackets with collar bolts up or down in the slotted lumbar brackets.

Lumbar frame 30 is padded on the forward facing side with foam 34 or other padding and then covered with leather or other appropriate material. The rider, after attaching lumbar support 30, will be able to adjust the position forward by simply pulling the lumbar frame towards him or her causing the brackets 25 and friction bar 23 to rotate such that the frame 30 moves forward (arrow F). Pressure then put against lumbar frame 30 by leaning his or her body into it will cause torsion spring 29 to lock on friction shaft 23 thus holding lumbar frame 30 in position. Lifting the unattached and exposed leg 29*a* of torsion spring 29 (in a rear rotational direction shown by arrow D) will release the hold on friction shaft 23 and allow friction shaft 23 to rotate in a direction of arrow D (FIG. 8) opposite to the rotational direction F in which the leg 29*a* is lifted, thereby letting lumbar frame 30 move backwards or aft in the direction of arrow R.

When the rider releases the exposed leg 29*a* of torsion spring 29, spring 29 will again stop rotation of friction shaft 23 and lumbar frame or support 30 locks in position. Lumbar support 30 in either version may fold in against itself to make a very tidy storable unit that will not weigh more than about twenty two to twenty four ounces. Spring end 29*a* may be covered with a tab or other covering for ease of use.

The mounting bracket design integrates with a seat, such as in the first embodiment, by the two parallel shafts 21 (e.g., approximately one half inch in diameter). These shafts 21 slide into accommodating holes 6*a* in the motorcycle seat pan 6 itself preferably and will stay in place simply by gravity and a friction fit (e.g., a somewhat tight tolerance, e.g., 0.08" to 0.10"). These mounting shafts 21 also provide for additional height adjustment as needed by telescoping the shafts in the holes 6*a*.

Figure 10:
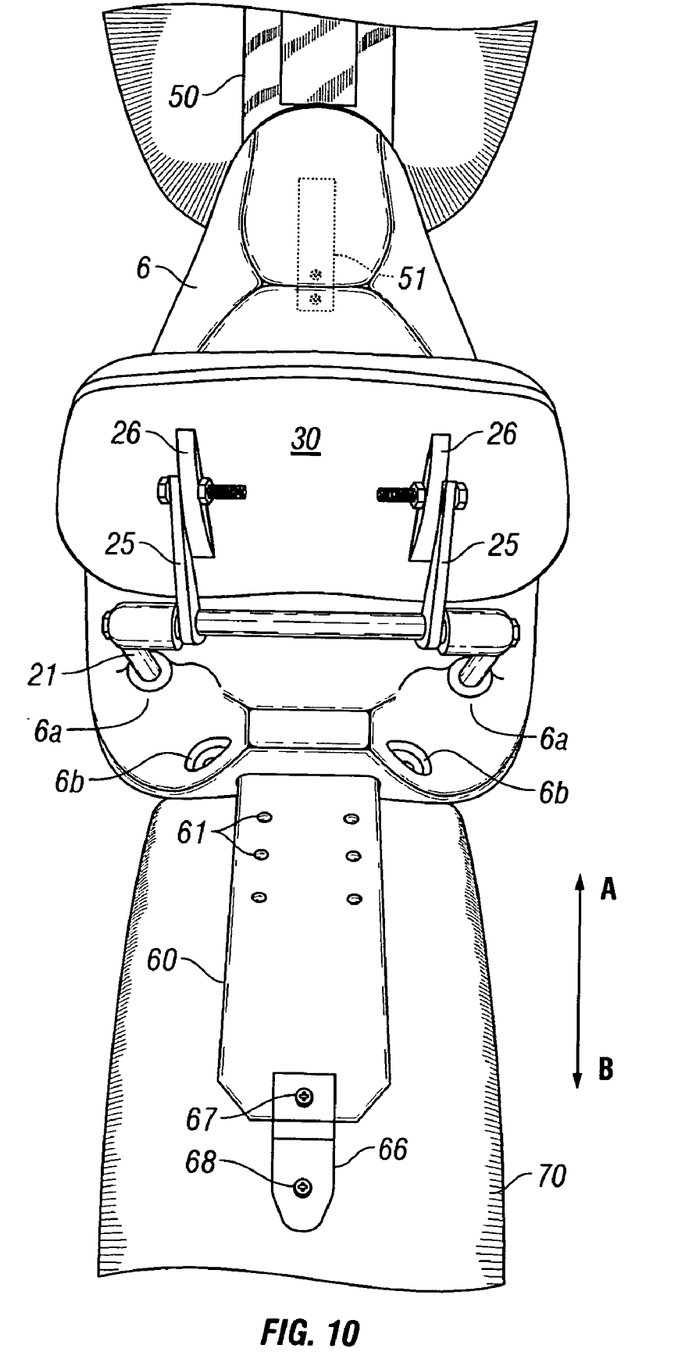
FIG. 10 is an enlarged view of the underside of an alternative embodiment of the pillion frame and seat pan.

The seat pillion (for a rear rider seat) is constructed preferably with a metal frame 60 (FIG. 10) having a polymer (rear) seat pan (not shown) on top, then cushioned with foam padding or an air valved system as defined above in the first embodiment, and then all covered in leather or other appropriate material(s). The polymer seat pan is preferably rectangular in shape and approximately 8"×12". The pillion 60 may have several holes 61 as shown in FIG. 10 that allow for adjustable positioning. Preferably, the seat pan slide mounts (for sliding forward, arrow A, or rearward, arrow B) on the metal pillion frame 60 whose tongue end 60*d* inserts into a slot 6*c* or cavity in the rear of (front) seat pan 6. The pillion is mounted to rear fender 70 at metal strap 66 by a bolt 68 and to the pillion by a bolt 67.

Figure 11:
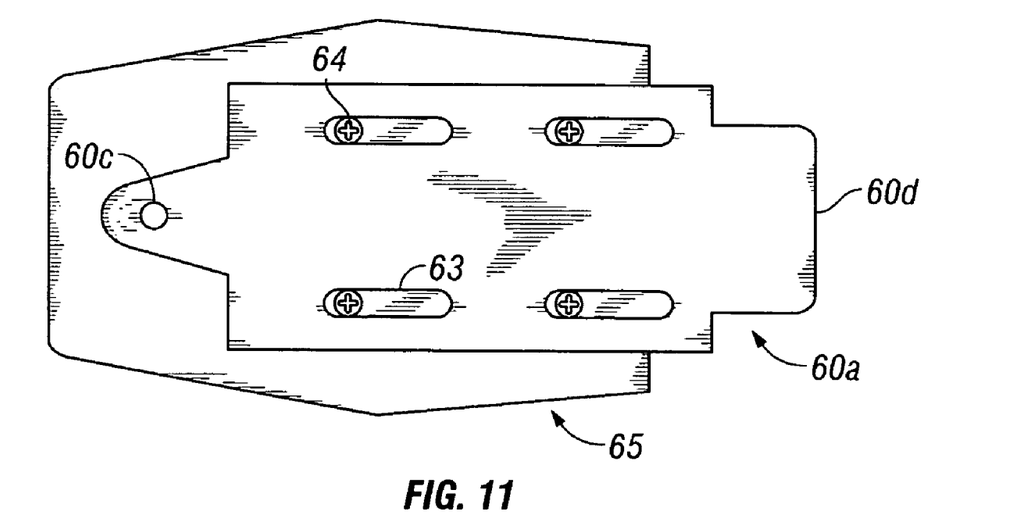
FIG. 11 is an enlarged view of the pillion frame of FIG. 10.

Alternatively, FIG. 11 shows a pillion frame 60*a* with two sets of slots 63 for a polymer seat pan, which allow adjustment of the pan by simply sliding it from front to rear (e.g., approximately 3") when screws 64 are loosened or while the screws are kept at a friction fit. Access to the fender mounting bolt (not shown) through hole 60c (or a metal strap bolted therein and to the fender) is provided when the seat is in the full aft position. Tongue 60d fits in slot 6c.

A rear foam with fabric cover seat on the seat pan are all represented by element 65. As shown in FIG. 10, the front of seat pan 6 may be attached to a frame 50 by a metal strap 51 and bolt or other mechanism.

In the preferred embodiment, the seat, lumbar support and pillion construction of the present application are combined.

As noted above, a motorcycle seat 6 incorporates an air chambered seat pad, and has the following components:

A seat pan made from aluminum, fiberglass, carbon composite, epoxy polymer resins, or injection molded plastics. The seat pan 6 is designed to accommodate the accompanying lumbar support by providing two (e.g., ½" female) shafts cast into the rear of the seat pan. The seat pan also provides a slotted cavity 6c roughly 2½" wide and 2" deep that houses the flat strap metal frame mounting bracket for the rear rider seat pillion. While stiff polymers are used to cast the seat pan, a softer compound is preferably used and cast directly into the seat pan where the raised frame contact points are, roughly six.

A two-part polymer foam seat core is either cast with appropriate cavity for an air bag or cast directly over and around the air bag unit. The foam seat core will be cast directly onto the seat pan and will achieve adhesion in the curing process or will be cast separately and then cemented to the seat pan.

As shown in FIG. 5, the pocketed air bag insert with chambers 18 having passages or conduits 18a (valves) can be filled manually (by mouth) via valve 18b or may employ an onboard twelve volt air-pump to adjust the ride while riding. The conduits or valves allow passage of air.

The airbag will provide unparalleled comfort and relief from fatigue by allowing air to pass from chamber to chamber according to the changing pressure asserted by the rider. The airbag will reside between the seat pan and the seat cover and will be in contact with the seat pan or the seat cover or both and will be surrounded by the foam seat-core. The airbag may be buffered with further cushioning material between seat pan or seat cover.

A seat cover of leather or vinyl simulation will encase the seat core and wrap around sufficiently to be attached to the underside of the seat pan, with screws, rivets or appropriate adhesive and/or combinations thereof.

In accordance with another embodiment of the invention, there is an alternative version of a folding, fully adjustable fore and aft, up and down, removable lumbar/backrest support for motorcycle and the like.

With reference to FIGS. 12-15 two mounting brackets 121 slide into, clip onto or bolt to an existing or aftermarket seat. Connecting the two mounting brackets 121 is a single combined through rod and friction shaft 122 (e.g., 0.5 inch diameter) threaded on both ends 122a, 122b. Hereinafter, the combined rod/shaft will be referred to as a friction shaft.

Figures 12, 13:
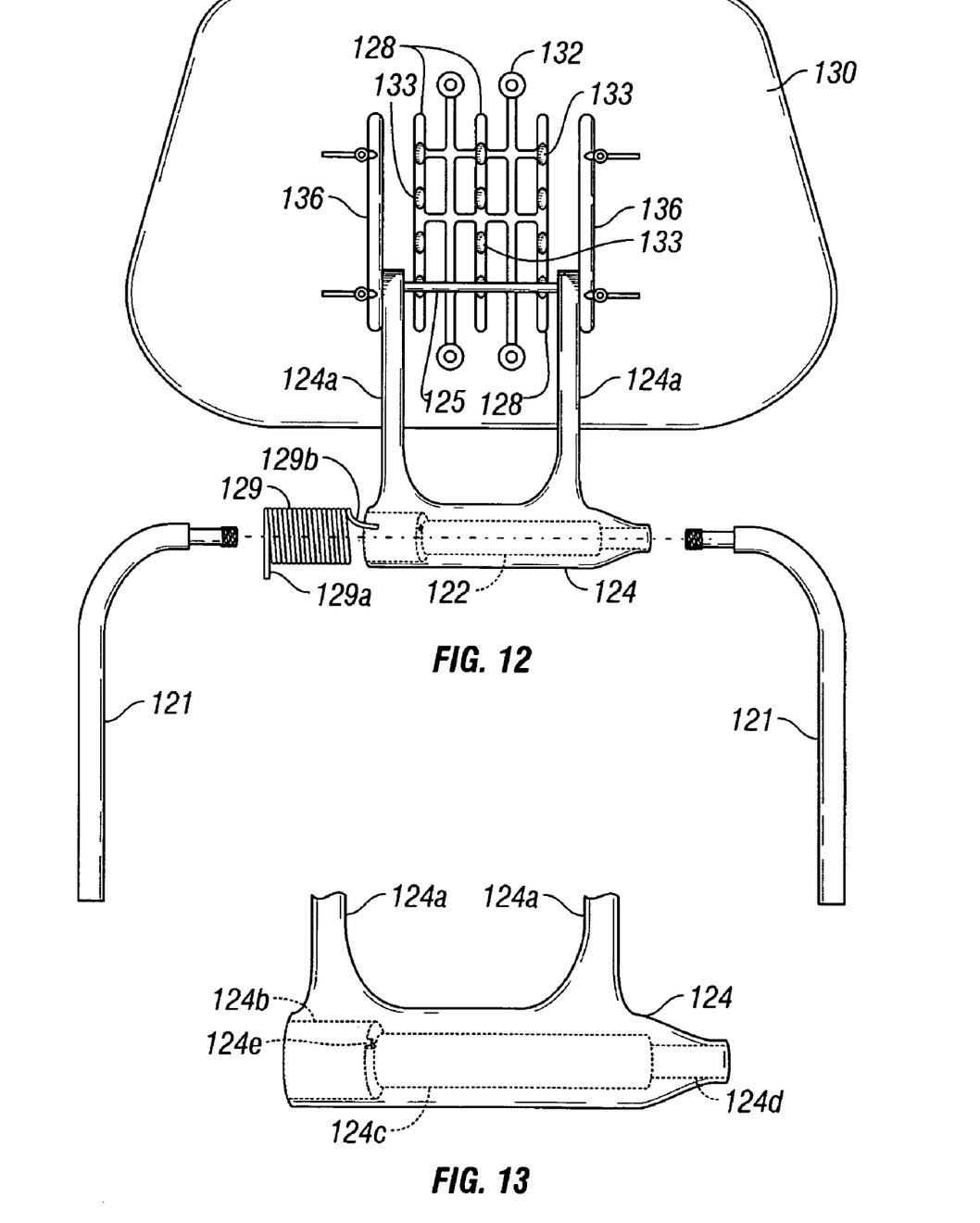
FIG. 12 is a rear elevational and partial exploded view of another embodiment of a lumbar support system of the invention, without a cover plate.
FIG. 13 is an enlarged view of details of a pivotable mounting portion of the lumbar support system of FIG. 12.

The connection of pivot housing 124, brackets 121, friction shaft 122, and spring 129, will now be more fully described.

The brackets 121 have externally threaded upper ends that thread into each end of shaft 122, so shaft 122 is fixed with respect to the brackets 121. The opening 124d in the right side of pivot housing 124 for right bracket 121 just accommodates bracket 121. Friction shaft 122 is just accommodated within channel or opening 124c in the housing 124. Left bracket 121 easily fits within opening 124b on the left side of the housing. The friction shaft 122 ideally extends into opening 124b also, which is sized to accommodate spring 129 too. A recess 124e in housing 124 receives end 129b of the spring 129, thereby "locking" the housing to the spring.

A torsion spring 129 is housed around one end of friction shaft 122 with zero clearance between the friction shaft (outer diameter) and the torsion spring (inner diameter). This assembly will reside within the pivot housing 124 with one leg 129b of the torsion spring attaching to the pivot housing 124 (roughly 1" inside) thus keeping the torsion spring stationary with the pivot housing. The friction shaft will be able to rotate inside the spring in one direction of rotation to move the frame 130 forward while binding against the spring in the other direction of rotation, as in the previous embodiment. There is sufficient friction between the spring and shaft to hold the lumbar frame from simply collapsing forward. The other leg 129a of the torsion spring will remain unattached and exposed so that lifting the leg against the directional wind of the spring releases the torsion spring grip on the friction shaft. The legs 124a of the pivot housing 124 shall be of sufficient length to provide a fore and aft motion when rotated. Pivot shaft 125 provides an axis for lumbar frame 130 to swivel and height adjustment as well.

Figure 14:
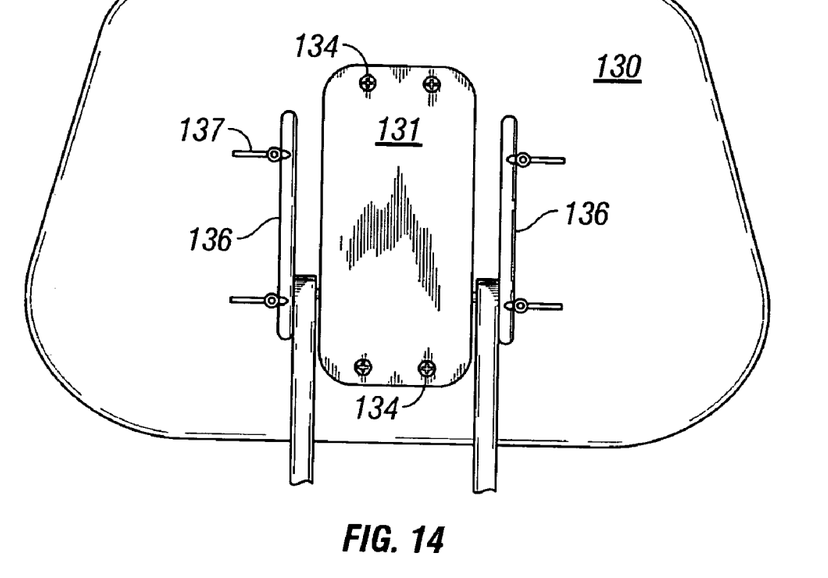
FIG. 14 is a rear view of a portion of the lumbar support system of FIG. 12 with a cover plate.

Lumbar frame 130 is preferably made from plastic, polymer, or resin based material and has parallel rails 128 (e.g., three) with multiple recesses 133 or channels that pivot shaft 125 resides in. Rails 128 ideally will allow for 3 or 4 height adjustments depending on which recesses 133 are used. In the illustrated embodiment, there are four sets of recesses 133. A cover plate 131 holds pivot shaft 125 on rails 128 in the recesses 133 by mounting to four dowel towers 132 and bolts 134. The cover plate 131 provides enough pressure to allow pivot shaft 125 to ride along rails 128 with ease but cause pivot shaft 126 to snap into place at the various recesses 133. Two support rails 136 keep legs 124a stable and referenced properly while moving along rails 128. Each rail 136 has two mounting brackets 137 for stability and/or for mounting a cover.

The lumbar frame 130 is padded on the opposing side with foam or other padding and then covered with leather or other appropriate material, as in the previous embodiment.

The rider, after attaching the lumbar support, will be able to adjust the position forward by simply puling lumbar frame 130 forward towards himself or herself. Pressure then put against the lumbar frame by leaning his or her body into it will cause the torsion spring 129 to lock on the friction shaft 122 thus holding the lumbar frame in position. Lifting the unattached and exposed torsion spring leg 129a (into the page in FIG. 12) will release the hold on the friction shaft 122 and allow the friction shaft to rotate the other direction letting the lumbar frame move backwards or aft. Releasing the torsion spring leg will again stop the rotation ability of the friction shaft and the lumbar frame/pivot housing lock in position.

Figure 15:
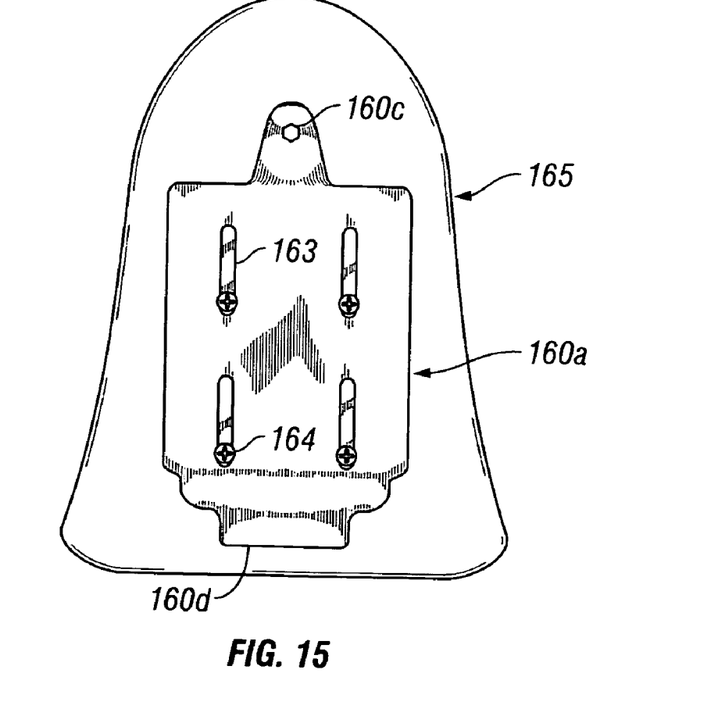
FIG. 15 is another view of a pillion frame similar to that of FIG. 11.

FIG. 15 shows an alternative version of a second seat and pillion, with corresponding references numerals having 100 added thereto from the version of the second (rear optional) seat of FIG. 11.

The lumbar support in either version will fold in against itself to make a very tidy storable unit that will not weight more than about 22 or 24 ounces. The mounting bracket design that will integrating with the seat will be two parallel shafts 121 (approximately 0.5 dia.) as shown. These slide into accommodating holes in the motorcycle seat itself and will stay in place simply by gravity and a somewhat tight tolerance (e.g., 0.08 to 0.10 inch). These mounting shafts also provide additional height adjustment as needed.

Although the invention has been described using specific terms, devices, and/or methods, such description is for illustrative purposes of the preferred embodiment(s) only. Changes may be made to the preferred embodiment(s) by those of ordinary skill in the art without departing from the scope of the present invention, which is set forth in the following claims. In addition, it should be understood that aspects of the preferred embodiment(s) generally may be interchanged in whole or in part.

What is claimed is:

1. A comfort system for an open air vehicle having at least two wheels, a front and a rear, the comfort system comprising:
   a seat with a lumbar support mounted proximate a rear portion of the seat, the lumbar support comprising a padded lumbar frame for supporting a rider's back, means for adjusting a position of the lumbar support selectively upward and downward, wherein the means for adjusting comprises:
   i) a mounting bracket attached at one end to the seat and having another end;
   ii) a body connected to the other end of the mounting bracket, the body having a base section and two arms extending from the base section, and having a rod extending between the two arms;
   iii) a series of parallel members fixed to a back of the padded lumbar frame and having aligned sets of notches therein, each set of notches being vertically spaced from a first lowest set to a last topmost set; and
   iv) a pair of parallel rails fixed to the back of the padded lumbar frame, and the two arms having engagement means proximate their free ends for being movably engaged with the rails to thereby move with respect to the rails, and whereby a height of the padded lumbar support above the seat may be adjusted by moving the engagement means up and down with respect to the rails and thereby moving the rod into and out of engagement with selective ones of the sets of notches.

2. The comfort system of claim 1, wherein the seat has a seat pan and padding, and
   a multi-chambered fluid cushion disposed on the seat pan and in the padding.

3. The comfort system of claim 2, wherein the multi-chambered fluid cushion comprises multiple fluid chambers in direct fluid communication with each adjacent chamber.

4. The comfort system of claim 1 wherein the body is connected to the mounting bracket, and the mounting bracket has a bent bar which is externally threaded and received by an internally threaded portion of the base section of the body.

5. The comfort system of claim 1 wherein the body is "U-shaped," and the two arms extend from opposite ends of the base section of the body.

6. The comfort system of claim 1 wherein the rod extending between the arms is located proximate ends of the arms which are remote from the base section.

7. The Comfort System of claim 1, further comprising a torsion spring housed within the body and biasing the padded lumbar frame in a forward direction toward a rider, wherein one end of the torsion spring is attached to the base section and the other end of the torsion spring is left unattached, whereby when a rider sufficiently pushes against the padded lumbar frame, the body is urged to rotate about the support bracket, which in turn rotates against the bias of the torsion spring, whereby the padded lumbar frame may be moved backward with respect to the seat.

8. The Comfort System of claim 7, wherein the frame with parallel members may be swiveled about the rod when the lumbar support is not in use.

9. The Comfort System of claim 1, wherein the frame with parallel members may be swiveled about the rod when the lumbar support is not in use.

10. The Comfort System of claim 1, wherein the mounting bracket includes a bent rod.

11. A comfort system for an open air vehicle having at least two wheels, a front and a rear, the comfort system comprising:
    a seat with a lumbar support mounted proximate a rear portion of the seat, the lumbar support comprising a padded lumbar frame for supporting a rider's back, means for adjusting a position of the lumbar support selectively toward the front and rear of the seat, wherein the means for adjusting comprises:
    i) a mounting bracket comprising a bent rod connected to, extending from and having a vertically upward component from the seat;
    ii) a U-shaped body rotatably connected to the mounting bracket, the body having a base section and two arms;
    iii) a series of parallel members fixed to a back of the padded lumbar frame and having aligned sets of notches therein, each set of notches being vertically spaced from a first lowest set to a last topmost set; and
    iv) a rod extending between and the two arms of the base wherein the rod is received by a selected set of the notches of the parallel members, wherein the frame with parallel members may be swiveled about the rod when the lumbar support is not in use.

12. The Comfort System of claim 11, wherein the two arms extend from opposite ends of the base.

13. The Comfort System of claim 11, wherein the rod extends between the two arms proximate the free ends of the arms allowing the lumbar frame to rotate.

14. The Comfort System of claim 11, further comprising a torsion spring housed within the body and biasing the padded lumbar frame in a forward direction toward a rider, wherein one end of the torsion spring is attached to the base section and the other end of the torsion spring is left unattached, whereby when a rider sufficiently pushes against the padded lumbar frame, the body is urged to rotate about the support bracket, which in turn rotates against the bias of the torsion spring, whereby the padded lumbar frame may be moved backward with respect to the seat.

* * * * *